July 19, 1955  L. M. SWIFT  2,713,395
REFRACTION SHOOTING
Filed March 28, 1951  2 Sheets-Sheet 1
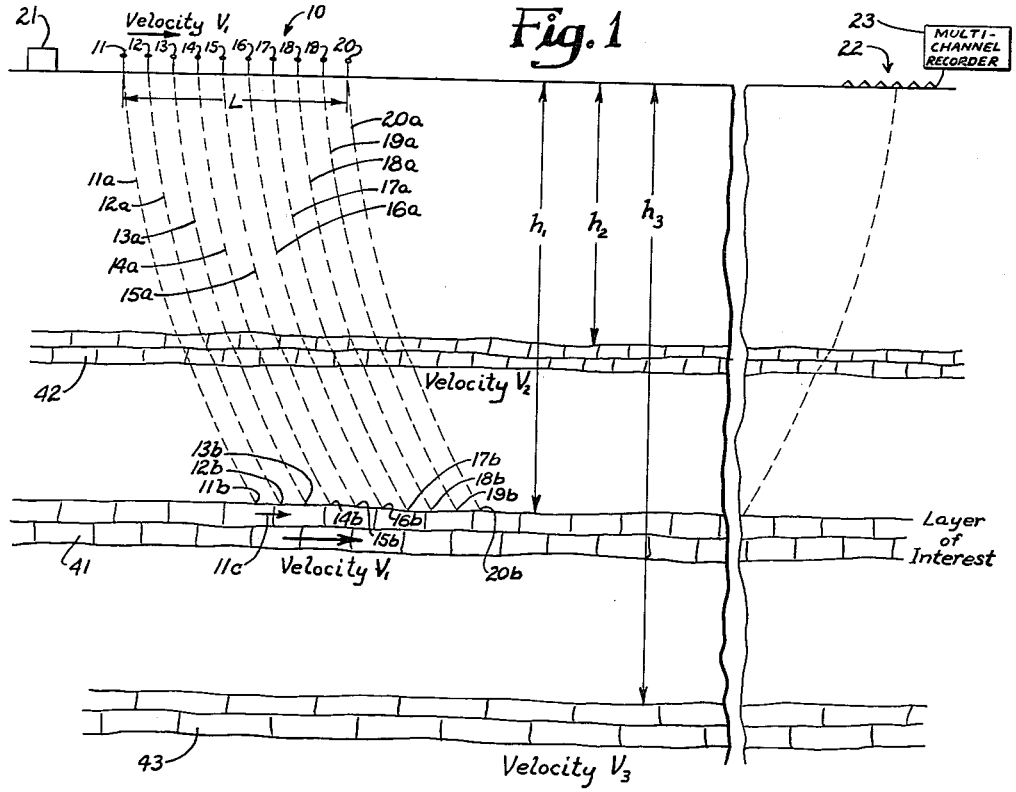
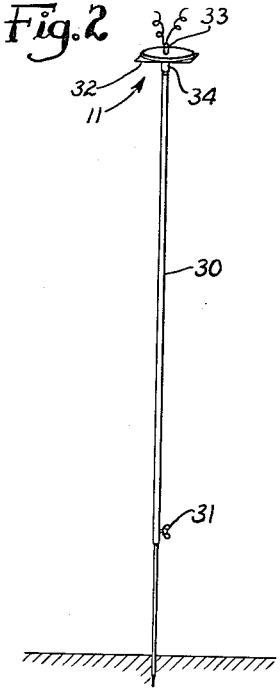
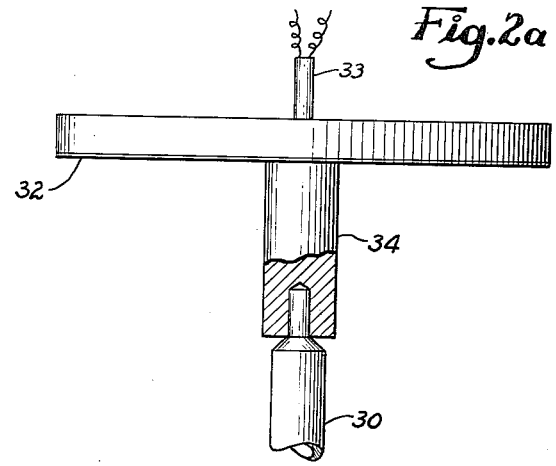
INVENTOR.
Lawrence Merton Swift July 19, 1955  L. M. SWIFT  2,713,395
REFRACTION SHOOTING
Filed March 28, 1951 2 Sheets-Sheet 2
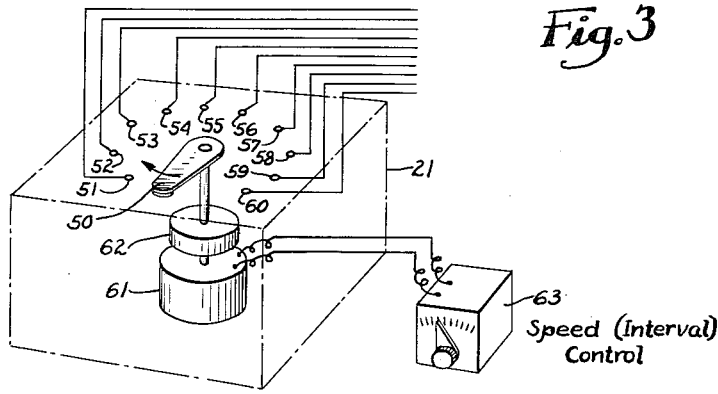
Fig. 3
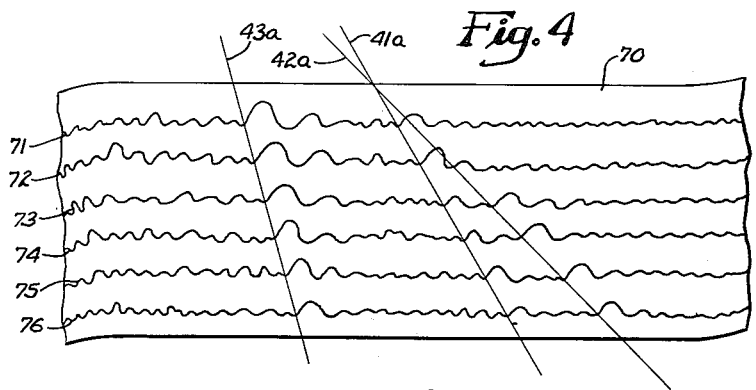
Fig. 4
Fig. 5
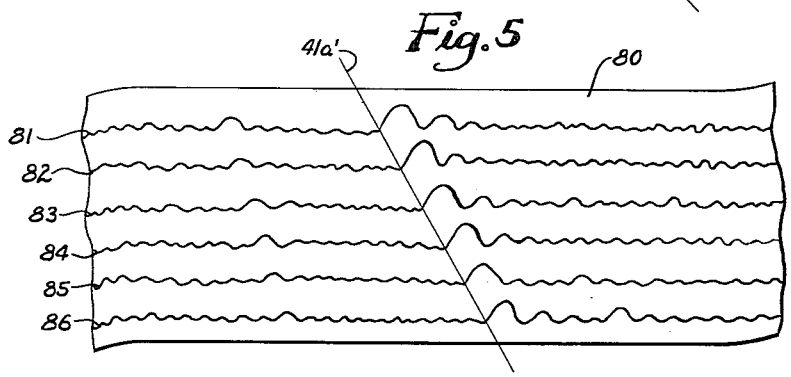
Fig. 6
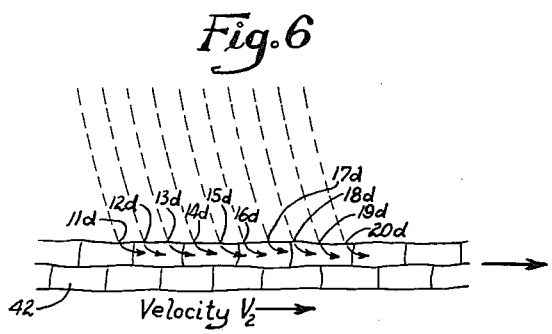
INVENTOR.
Lawrence Merton Swift
BY
Carlson, Pitzner, Hubbard + Wolfe
Attys.

2,713,395

REFRACTION SHOOTING

Lawrence Merton Swift, Menlo Park, Calif., assignor to Institute of Inventive Research, San Antonio, Tex., a trust estate Application March 28, 1951, Serial No. 218,029

1 Claim. (Cl. 181—0.5)

The present invention relates to geophysical exploration, and more particularly to a formation of an improved seismic wave for refraction shooting of submerged horizons.

Today the great majority of seismic exploratory work is in the field of reflection shooting because it is more direct, because of the relatively limited area of submerged horizons acted upon and the degree of accuracy which can be achieved. As covered in Poulter Patent No. 2,545,380, a seismic setup and method of shooting are disclosed which enable the shooting to be greatly expedited and the quality of the reflection records considerably improved. It has been felt by many in this art that the Poulter Method of arranging and firing charges in the air had little or no application to refraction work. One of the reasons that the firing of a pattern of air charges was considered to be inherently unsatisfactory was the high degree of downward directivity which is obtained. In refraction shooting it is not primarily the energy directed straight down which is of interest, but rather that which is directed off at an angle from the vertical.

Experience has shown that refraction shooting, as conventionally practiced, is accompanied by a number of rather serious disadvantages. In the first place, shot holes are required in order to avoid the severe loss of energy which occurs because of the weathered surface layer. Furthermore, the records which have been obtained have been far from satisfactory. Each submerged horizon produces its own "event" in the form of an inclined "alinement" on the record. These events are frequently of approximately the same magnitude and are often run together and overlapped so that reading the event and distinguishing it from other events and background noise becomes a difficult task and one which produces uncertain results.

Where penetration to appreciable depth is required it is well known that the spacing between the shot hole and the detectors must be made great. In conventional refraction shooting the received signals are therefore relatively weak and it becomes difficult or impossible to distinguish the desired arrivals from local disturbances due to wind noise, amplifier noise and the like. In order to increase the energy of these arrivals, larger and larger charges have been employed. Unfortunately, this procedure becomes inefficient for two reasons: First, it is now known that the losses in the immediate vicinity of the shot point are such as to absorb a large percentage of the energy and that these losses are proportionately greater with larger charges; thus, the expected increase in energy is not obtained when the charge size is increased. Secondly, due to the fact that relatively small diameter shot holes are used, a large charge may be quite long. As a result, the energy originating from the top of the charge arrives considerably later than that from the bottom, reducing the sharpness of the "breaks" and defeating the purpose of the larger charge.

Accordingly, an object of the present invention is to provide a procedure for arranging and firing charges for refraction shooting which makes it possible to obtain satisfactory results from a total quantity of explosive charges less than that conventionally employed. It is a correlative object to provide a procedure for arranging and firing charges which enables the energy of a large total weight of explosives to be efficiently employed for refraction shooting over long distances.

It is another object of the present invention to provide a method and apparatus for refraction shooting which employs a novel arrangement of air-fired charges and novel manner of firing them so as to produce a seismic wave which is efficiently transmitted through the earth structure and efficiently refracted by a submerged layer to produce clear and easily interpreted records at a remotely located pick-up point. It is a related object of the invention to provide a novel arrangement of charges and method of firing so that refraction may be caused to take place efficiently at a selected horizon or layer with a minimum amount of seismic energy being usefully refracted at layers which are not of interest.

It is still another object of the invention to provide a procedure for arranging and firing charges for refraction shooting which enables a desired event on the record to be greatly emphasized and all undesired events substantially attenuated so as to produce easily interpreted records which are substantially free of undesired background noise and from which the useful data may be readily obtained.

It is a further object of the invention to provide procedure for arranging and firing charges for refraction shooting which not only improves the records which may be obtained in this type of shooting, but which also completely overcomes the disadvantages which are associated with the use of a shot hole. When using the present invention the time required to arrange the charges for firing is reduced to a minimum and no expensive drilling is required. The energy is, for the most part, directed downwardly instead of being uselessly expended in a lateral direction in the crushing of earth structure, and the energy is concentrated in useful frequencies rather than in the very low frequencies which cause ground roll or very high frequencies which are very poorly transmitted in the earth.

Finally, it is an object of the invention to provide a charge array and manner of firing the same which is effective to transmit the maximum amount of useful energy to the recording station to the exclusion of energy from horizons or layers not of interest, thereby making it unnecessary to make confirmatory shots employing different amounts of offset.

Other objects and advantages of the invention will become apparent upon reading the following detailed description and upon reference to the drawings in which:

Figure 1 is a vertical section of the earth in the path of the refracted energy showing explosive charges arranged in accordance with the present invention.

Fig. 2 is a view in perspective of a preferred form of charge and showing the manner in which the charge is supported above the surface of the earth.

Fig. 2a shows the charge support of Fig. 2 in greater detail.

Fig. 3 shows a firing device for firing the charges of Figure 1 in timed sequence.

Fig. 4 shows the typical appearance of a record conventionally obtained in refraction shooting and indicating the receipt of energy from three submerged layers in the earth.

Fig. 5 shows the typical appearance of a record obtained employing the present invention with the significant energy from a desired layer greatly accentuated as compared to the energies from layers which are not of interest.

Fig. 6 shows a submerged layer which is not of interest, in order to illustrate the self-cancellation which occurs in such layer.

While the invention is susceptible of various modifications, I have shown in the drawings and will herein describe in detail only one embodiment of the invention. It is to be understood, however, that I do not intend to limit the invention by such disclosure but aim to cover all modifications and methods falling within the spirit and scope of the invention as expressed in the appended claim.

Referring now to Figure 1, there is disclosed a setup for refraction shooting in accordance with the present invention. At the shot area a charge array 10 is employed which consists of a series of elevated charges 11–20, inclusive. A firing device 21, to which more detailed reference will be made, is employed for firing the charges in a particular sequence.

Typical of refraction shooting, a geophone spread indicated at 22 is located at a remote point, which is on the order of two to eight miles distant. This geophone spread is connected to a multi-channel recorder 23 of the conventional type well known to one skilled in this art.

The preferred form of charge is disclosed in Fig. 2, the charge 11 being taken as exemplary. Such charge is supported on a steel pole 30 having an adjustment 31 for adjusting the elevation of the charge above the surface of the ground. At the upper end of the pole 30 is a support 32 which is so constructed as to offer substantially no obstruction to the downward propagation of a shock wave when the charge is detonated, detonation being effected by a centrally placed cap 33. In the present instance the support 32 consists of a very thin layer of cardboard, the cardboard in turn being supported on a small block of wood or the like 34 which is engaged by the upper end of the pole 30 (Fig. 2a). It has been found that this arrangement offers very little obstruction to the passage of the supersonic shock wave downwardly from the charge. The support 32 and block 34 are expended when the charge is detonated, although it has been found that the pole 30 is substantially undamaged and may be used over and over again.

Referring to the charge 11 in greater detail, it is preferably a "flat" charge of the type disclosed in the copending application of Dr. Thomas C. Poulter, Serial 29,307, which was filed on May 26, 1948. The charge is preferably disc-shaped, measuring approximately 9 or 10" in diameter and having a thickness of ½ to ¾". The amount of explosive which I prefer to use is on the order of two pounds per charge. Such explosive may be TNT or conventional high velocity seismograph gelatin. The latter is commercially supplied in cylinders of approximately 9" in diameter and the required thin slices may be easily and quickly cut therefrom. The charges 11–20 so formed are arranged at the same height above the surface of the earth. This height should be sufficient so that the ground below the charge is not subjected to any shattering or destructive effect from the blast, yet the charge should be close enough to the ground so that the supersonic or shock wave set up by the detonation is still of supersonic velocity at the moment of impact with the ground. To fulfill these conditions it has been found that a range of 5 to 15 feet is satisfactory, a height of 10 feet being preferred for the particular size of charge described above. Upon detonation of the charge the supersonic wave, being substantially unobstructed, proceeds flatly in a downward direction, striking the earth at supersonic velocity over a relatively large area. As described in detail in the Poulter patent application mentioned above, the supersonic wave strikes the earth substantially flatly over an area which is up to four hundred times greater than the area of the charge itself. Upon impact a seismic wave is set up in the earth which has a substantially flat wave front over a considerable area. Consequently the seismic energy does not spread out laterally to the degree which would be encountered upon the firing of an ordinary charge, but tends to be concentrated in a cone of energy. For the particular charge disclosed it can be shown that about 85% of the energy in the ground is included within a cone having an included angle of 90°.

In practising the present invention, charges of the type shown in Fig. 2 are laterally spaced from one another in the direction of the geophone spread 22. All of the charges are arranged at the same height and the lateral spacing between adjacent charges is substantially the same. The charges are then fired at intervals starting with the charge farthest away from the geophone spread and in such manner that refraction of the recorded energy takes place in a selected submerged layer. In Figure 1 the selected layer or layer of interest, indicated at 41, is a layer which is known to have significance relative to oil deposits because of previous measurements which have been made in the area. An example of such a layer is the Ellenberger in the Southwest which is known to have associated oil deposits. In addition to the layer of interest there are other layers, for example, as indicated at 42 and 43, which do not have any particular significance and serve only to confuse the record when conventional refraction shooting is employed. For the purpose of readily understanding the invention it will be assumed that these layers are at depths $h_1$, $h_2$ and $h_3$, and have velocities of seismic propagation which are, respectively, $v_1$, $v_2$ and $v_3$.

In order to fire the charges 11–20 in the desired sequence, the firing device 21 (Fig. 3) includes a commutating switch 50 having a series of contacts 51–60, which are connected to the caps in charges 11–20, respectively. For the purpose of driving the switch at a precisely timed rate, a timing motor 61 is used which is coupled to the switch 50 by means of a positive engaging clutch 62. The speed of the driving motor is controlled by a manually adjustable control 63 which may be referred to as the interval controller, enabling the firing interval to be precisely set and maintained between all of the charges in the array.

In practising the invention the charges are so spaced and the control 63 so adjusted that the rate of propagation of firing along the surface of the earth is equal to the rate of propagation of the refracted wave in the submerged layer of interest. More specifically, the charges are fired so that explosion of the charges 11–20 progresses sequentially at a velocity $v_1$ along the surface of the ground which is the same as the assumed seismic velocity $v_1$ in the layer 41. This direction and rate of firing are indicated by the vector $v_1$ in Fig. 1. In order properly to adjust the timing interval it is of course necessary to know rather accurately the velocity of propagation $v_1$ in the layer of interest. This can be obtained using techniques which are well known to one skilled in the art of refraction shooting, and therefore need not be spelled out herein. It will suffice to say that seismic velocity in the layer 41 is obtained by firing a test shot and comparing the records obtained at a succession of pick-up points.

I have observed that firing the charges in the manner set forth above causes a record to be produced which differs rather significantly from the records obtained when using a shot hole. The difference in the records may be made clear by reference to Figs. 4 and 5 which are intended to be purely diagrammatic and explanatory. Fig. 4 shows a record 70 having six traces 71–76. Assuming the background noise is sufficiently low, three "events" may be detected on the record 70. These events have been indicated as lines of alinement to which numerals $41_a$, $42_a$, $43_a$ have been applied corresponding to the refracting layers 41, 42, 43 in Fig. 1. In the normal case identification of these events is rather difficult and in many cases impossible because of the fact that the energies received from the layers which are not of interest tend to confuse and mask the energy received from the layer which is of interest. As shown in Fig. 4, the event $42_a$ is of substantially the same magnitude as the event $41_a$ and the overlapping tends to confuse the interpretation of the event 41a. Quite frequently the event corresponding to the layer of interest is so masked as to defy detection. In an endeavor to clarify conventional records, the distance between the shot point and the geophone spread is on occasion quite radically changed, for example, from eight miles to six miles. This is done in an effort to separate the events on the record and requires the firing of additional explosive and takes up additional time for reshooting.

The above is contrasted with the general type of record indicated at 80 in Fig. 5 which is obtained when employing the present invention. This record includes six traces which have been designated 81 to 86, respectively. It will be seen that the only event which stands out on the record is the event 41a' received from the layer 41. The events 42a and 43a appearing rather prominently in Fig. 4 are either barely detectable or non-existent. It further be noted that the extraneous vibrations or background noise is considerably reduced in Fig. 5, as is characteristic of the present invention. If desired, especially where the distance between the charge and the recording station is great, the charges may be much larger than two pounds, for example, up to ten pounds or more. Even though the total amount of explosive in the array is great the effect on the record is merely to increase the amplitude of the event without sacrificing sharpness of the break and without substantially increasing the background noise.

The manner in which the improved result is achieved can be explained by reference to Fig. 1. In refraction shooting, as in other types of shooting, it is the first arrival which is significant in the obtaining of depth data, the energies subsequently received merely serving to produce spurious reverberations which result in background noise farther along the record. The first arrivals, by definition, arrive at the geophone spread 22 along a minimum time path which permits the wave to travel most rapidly. The minimum time paths from each of the charges 11–20 are different, and are indicated at $11_a$–$20_a$ in Fig. 1. The energy from the charge 11 which is fired first travels downwardly along the path $11_a$, striking the refracting horizon 41 at a point $11_b$. After striking the point $11_b$ the energy progresses horizontally through the stratum 41 at a velocity $v_1$, as indicated at $11_c$. The same thing occurs when the second charge 12 is fired, transmission taking place along the path $12_a$ and contact with the refracting layer being made at $12_b$. Subsequent transmission takes place through the layer 41, just as in the case of the energy from the first charge and at a velocity $v_1$. Since the paths from the surface to the refracting layer 41 are equal from all the charges and since the distance between the points of incidence $11_b$–$20_b$ on the refracting layer is equal to the distance between the charges, it will be apparent that the seismic waves from the separate charges will add together in the layer 41 in phase with one another. The energies from each of the charges therefore all arrive at the same time at what may be termed a "final collecting point" $20_b$ (Fig. 1) and then pass in unison horizontally along the layer 41 and thence upwardly to the geophone spread 22.

For optimum results I have found that the length L of the charge array should be in the range of one-half to almost one full wave length of the seismic wave in the refracting layer 41. Since the normally encountered seismic velocity in a refracting layer is within the range of 6,000 to 15,000 feet per second, the wave length at the predominating frequency, say about 30 cycles, will generally be within the range of 200 to 500 feet. Consequently, the minimum length of the charge array should be about one hundred feet.

With regard to the number of charges employed in a single array, I have found that approximately ten charges is a convenient number for use in the field and produces satisfactory results; and this is the number shown in the drawing. Additional charges may of course be employed without departing from the invention. If such charges are spaced more closely together, the commutating switch in the firing device would, of course, have to be correspondingly adjusted for a shorter interval to maintain the rate of propagation of firing at the same value $v_1$. The spacing of the charges should not be any closer than about 10 feet in order to avoid interference between the explosions and to enable each charge to act substantially independently over the area under the charge.

It is found that under circumferences normally encountered in the field, the paths of propagation $11_a$–$20_a$ lie within the cones of maximum seismic energy produced by the respective charges 11–20. Consequently, the seismic energies received from each of the charges are at a relatively high intensity and, together with the in-phase addition which takes place, serve further to increase the intensity of the seismic wave proceeding upwardly to the geophone spread.

The present invention makes use of the fact that many refracting layers at various depths have velocities of seismic propagation which are rather distinctly different. In Fig. 1 these velocities have been indicated at $v_1$, $v_2$, $v_3$. By firing the charges in the manner disclosed above it can readily be seen that the energy which is refracted from layers not of interest, for example, the layer 42, will be at an extremely low level compared to the refracted energy received from the layer 41. Referring to Fig. 6, the layer 42 is separately shown and the points of incidence of the seismic waves from each of the charges are indicated at $11_d$–$20_d$. Since the velocity of this layer 42 is $v_2$ rather than $v_1$, which is the propagation rate of firing, the energies impinging upon the layer 42 and travelling horizontally therein will not arrive at the final collection point $20_d$ in phase. Instead, they will be out of phase and therefore tend to cancel one another. The net energy which remains to be transmitted along the layer 42 and then upwardly to the geophone spread is thus at an extremely low level causing little or no effect on the record. The same will be true of the energy received from the layer 43 and all other layers having a seismic velocity other than $v_1$.

While the invention has been described above in connection with flat charges, it will be understood by one skilled in the art that the invention is not so limited. If desired, the flat charges 11–20 may be replaced by concentrated charges, for example, in the form of short vertical cylinders of seismic gelatin having a diameter of approximately 3 inches. While it is true that the seismic wave set up by each of the charges will not, under such circumstances, be quite as flat and directive in nature, nevertheless satisfactory results will be obtained in normal areas. Regardless of the shape of the charge, it is desirable to have the charges elevated at the same height from the ground for applying supersonic waves thereto along successive areas in the direction of the geophone spread.

An electromechanical commutating switch has been disclosed for firing the charges, however, it will be understood that this is merely by way of example in order to bring out clearly that the firing is done sequentially. If desired, an electronic timer may be substituted having a series of sequentially triggered timing circuits for firing the charges. The design of such a timer is well within the capacity of one skilled in the electronic art and the individual timing circuits may, if desired, be of the type in which the interval is determined by the charging time of a capacitor in an RC circuit.

Still another means may be employed for firing the charges in sequence. If desired, the charges may be interconnected by links of primacord. Since the detonation rate in primacord has been accurately determined, it is a simple matter to select the length which gives the desired firing interval between adjacent charges. Since the rate of detonation in primacord is greater than the firing propagation rate, the length of the primacord will normally be greater than the spacing between adjacent charges.

Although the invention has been described in connection with charges which are equally spaced from one another, it will be apparent that the invention is not so limited. If desired, the charges may be spaced at unequal distances from one another provided that the firing intervals are correspondingly adjusted so that the rate of propagation of firing remains the same and equal to the seismic velocity in the layer of interest. For example, if the distance between two adjacent charges in the direction of the geophone spread is increased by a factor of 2, then the firing interval must also be increased by a factor of 2. It will also be understood by one skilled in this art that the invention is not limited to charges which are precisely alined with the recording station. While it is true that this is the preferred arrangement, nevertheless the charges may be laterally offset from one another to a limited degree and may, for example, be arranged in a zig zag formation without departing from the invention. Or, if desired, the charges may be arranged in line but at a slight angle with respect to the recording station. The important feature of the invention is that the charges are arranged and fired in such a manner that the component of the rate of firing propagation in the direction of the spread is equal to the seismic velocity in the layer of interest.

I claim as my invention:

An apparatus for use in a shot area and recording station for refraction shooting over a submerged layer of interest having a known characteristic seismic velocity comprising, in combination, a plurality of individual explosive charges at the shot area, means for supporting the charges above the surface of the ground and in a line which is generally alined with the direction of the recording station, the charges all being at substantially the same height with the underside substantially unobstructed for the passage of a shock wave downward from each of them, a firing device for detonating the charges in timed sequence to subject the ground thereunder to a series of shock wave fronts for setting up seismic waves directed downwardly toward said submerged layer, said firing device including means for firing the charges in such sequence that the rate of propagation of firing in the direction of the recording station is equal to the characteristic seismic velocity in said submerged layer, and means including geophones at said recording station for recording the said seismic wave after the same has been refracted in said submerged layer, said charges being distributed over a distance which is at least about half of the wave length of the seismic wave in said submerged layer and individual charges being spaced apart a sufficient distance so that the instant of firing is determined solely by said firing device free of direct explosive interference between adjacent charges.

References Cited in the file of this patent

UNITED STATES PATENTS

| | | |
|---|---|---|
| 1,899,970 | McCollum | Mar 7, 1933 |
| 2,340,314 | Farnham | Feb. 1, 1944 |
| 2,545,380 | Poulter | Mar. 13, 1951 |

OTHER REFERENCES

Publication, "Aerial Explosions Help to Find Hidden Oil," by Poulter, The Explosives Engineer, Jan.–Feb. 1949, pages 7 to 10, 27, 28.